United States Patent [19]

Kwon

[11] Patent Number: 5,820,960
[45] Date of Patent: Oct. 13, 1998

[54] THIN ZIRCONIA DISK SUBSTRATE

[75] Inventor: Oh-Hun Kwon, Westboro, Mass.

[73] Assignee: Saint-Gobain/Norton Industrial Ceramics Corporation, Worcester, Mass.

[21] Appl. No.: 649,746

[22] Filed: May 15, 1996

[51] Int. Cl.$^6$ ................................. B32B 3/02; G11B 5/66; G11B 5/70
[52] U.S. Cl. .................................. 428/64.1; 428/694 TR; 428/694 BR; 428/694 ST; 428/694 SG; 369/272; 369/283; 369/288; 426/64.2; 426/65.3; 426/65.6; 501/134
[58] Field of Search .......................... 428/64.1, 694 TR, 428/694 BR, 694 ST, 695 SG; 369/272, 283, 288; 426/64.2, 65.3, 656; 501/134

[56] References Cited

U.S. PATENT DOCUMENTS 4,598,017  7/1986  Bayer et al. ............................. 428/336

FOREIGN PATENT DOCUMENTS 0 131 895  1/1985  European Pat. Off. .

*Primary Examiner*—Lynette F. Smith
*Assistant Examiner*—Brett Nelson
*Attorney, Agent, or Firm*—Thomas M. DiMauro

[57] ABSTRACT

This invention relates to a disk substrate consisting essentially of zirconia partially stabilized by a rare earth oxide, the disk substrate having a thickness of no more than 0.635 mm, a diameter of at least 10 mm, and a mean pore size of no more than 0.1 um.

12 Claims, No Drawings

THIN ZIRCONIA DISK SUBSTRATE

BACKGROUND OF THE INVENTION

In the information systems presently used in computers and word processors, data (i.e., programs and files) are stored on and retrieved from the disk drive. The disk drive typically has three components: the read-write head ("head"), the actuator arm, and the hard magnetic disk ("disk"). In a conventional disk drive, the actuator arm directs the head over the disk so that the circuitry on the head can magnetically transmit bits of information between leads and the disk. In a conventional disk, a substrate (typically an Al/Mg alloy) has deposited thereon, consecutively, an electroless or anodized coating (Ni/P), a magnetic coating, a protective overcoat, and a liquid lubricant.

Due to the high density of information typically stored on a disk, the head must come very close to the disk during data transmission in order to insure accurate transfer. Accordingly, the space between the head and the disk (called a "flying height" or "air gap") is often between about 2–4 microinches. At such extremely small distances, both the head and the disk must be very flat. Thus, the material used for the disk should be very stiff and amenable to a fine finish.

When the disk and actuator arm move relative to each other, an air flow develops and allows the head to "float" above the disk. During operation, the head's ability to float prevents wear-inducing contact between the head and disk which degrades the accuracy of data transfer. However, the starting and stopping of the disk or arm often produces physical contact between the head and disk. Therefore, it is also desirable to make the disk substrate from a material which is wear resistant.

As noted above, most conventional disk substrates are made from a Al/Mg alloy overcoated with a Ni/P magnetic film. This alloy has been selected as the material of choice for the disk due to its superior wear resistance, stiffness and polishability, and performs well in the current relatively large disk drives.

However, increasing speed and capacity requirements are forcing disk drives to become smaller and smaller. Many of the current hard disk substrates are now manufactured in diameters of about 130 mm, 65 mm, 48 mm, and 34 mm. Moreover, there is a desire in the industry to move to even thinner disk substrates having thicknesses of about 0.381 mm or 0.635 mm. At these dimensions, it is believed that use of Al/Mg alloys as disk substrates will be problematic in that the elastic modulus of Al/Mg alloys (only about 100 GPa) will not provide the required stiffness (i.e., at least about 200 GPa).

Because of its high toughness, hardness and elastic modulus, the art has considered using zirconia partially stabilized by rare earth oxides (YTZP's). Conventional teachings concerning YTZP disks are found mainly in patent publications which teach their production by cold pressing a YTZP powder to form a thin green donut having a thickness of 2.3 to 4 mm, sintering and then hot isostatic pressing ("sinter-hipping") the donut to form a dense substrate, and finally lapping and polishing the substrate to provide the desired surface finish. However, the working examples in these publications disclose final thicknesses of about 1.9 to 2 mm. For example, JP 62078716 discloses a YTZP zirconia magnetic disk substrate having a thickness of 1.9 mm; JP 62078715 discloses a low density YTZP zirconia magnetic disk substrate having a thickness of 1.9 mm; and EPO Patent Application 0 131 895 ("EP '895") reports a YTZP zirconia magnetic disk substrate having a thickness of 2 mm. Of note, the need for disk substrates thinner than 2 mm was realized as early as 1986. For example, U.S. Pat. No. 4,598,017 noted weight concerns in disk drives and disclosed a ceramic disk substrate having a thickness of about 0.5 mm.

Moreover, as the need for efficient information storage grows, the bit size shrinks. At current bit sizes to about 1.5 um, disk substances containing porosity having an average pore size of about 1 um may cause the signal strength of the bit to be compromised. When the bit size shrinks in the future to less than 0.5 um, this porosity-induced signal recognition problem will be even more significant.

Therefore, there is a need for a partially stabilized YTZP zirconia disk substrate having a thickness of no more than 1.0 mm which is suitable for use as a disk substrate.

SUMMARY OF THE INVENTION

In accordance with the present invention, there is provided a disk substrate consisting essentially of zirconia partially stabilized by a rare earth oxide, the disk substrate having a thickness of no more than 1.0 mm, a diameter of at least 10 mm, and a mean pore size of no more than 0.1 um.

Preferably, the disk substrate has an impurity content of less than 0.25 weight percent ("w/o") of the disk substrate. For the purposes of the present invention, the term "impurity" includes at least the compounds of sodium (Na), silicon (Si), potassium (K), titanium (Ti), vanadium (V), chromium (Cr), manganese (Mn), iron (Fe), cobalt (Co), nickel (Ni), copper (Cu), and zinc (Zn). The weight percent of these impurities is measured as impurity oxides in their most oxidized state. For example, the iron impurity is calculated as $Fe_2O_3$.

More preferably, undesirable inclusions in the disk substrate (which typically derive from the impurities and are present as pockets of a second oxide phase) are characterized by a mean diameter of no more than 0.3 um.

In some embodiments, the disk substrate has a thickness of no more than about 0.381 mm, more preferably no more than about 0.254 mm. In some embodiments, it has a flatness (measured across the full diameter of the substrate) of no more than 10 um.

DETAILED DESCRIPTION OF THE INVENTION

Prior to the present invention, the ceramics industry did not fully understand how to control strength-degrading flaws in thin YTZP disks and so could not practicably produce YTZP disk substrates having a thickness of no more than 1.0 mm and a biaxial flexure strength of at least about 800 MPa, nor a porosity having a mean pore size of no more than 0.1 um. Accordingly, it is believed that the present invention's achievement of a thin, high strength YTZP disk substrate is attributable to the recognition of the necessity of careful processing which minimizes the size and frequency of certain flaws. In particular, two processing requirements (substrate purity and complete binder burnout) have been identified which are believed to be critical to obtaining the thin high strength YTZP substrate of the present invention and which were not identified as critical by the YTZP disk substrate art.

The first processing requirement which has been identified is YTZP powder purity. Preliminary studies on the effect of small amounts of impurity on the YTZP strength indicate the need to eliminate these impurities. In one experiment, a YTZP disk substrate was produced from a highly pure YTZP powder having less than 0.01 w/o impurity (HSY-3.0, from Daiichi Kigensho K. K. of Osaka, Japan). In another experiment, a YTZP disk substrate was processed substantially identically from a less pure powder having about 0.5 w/o impurity (YZ-110, a zirconia powder containing 2.7 mol % yttria available from Saint-Gobain/Norton Industrial Ceramics Corp. of Worcester, Mass.). Although the grain size of the latter powder was slightly larger, it was nonetheless below the critical grain size so that YTZP was retained in its tetragonal state. The YTZP disk substrates made from the highly pure powder had a mean pore size of less than about 0.1 um, pockets of a second oxide phase of less than about 0.3 um, and a biaxial flexure strength of about 1486 MPa. Conversely, The YTZP disk substrates made from the less pure powder had a mean pore size of less than about 1 um, pockets of a second oxide phase of less than about 0.5 um to 2 um, and a biaxial flexure strength of only about 1210 MPa.

It is believed that impurities impair the strength of YTZP by two routes. In the first route, the impurities produce significant pockets of a second oxide phase which act as inclusions. These inclusions tend to form during the sintering portion of a sinter-hip process and are typically present at grain boundaries in diameters on the order of 0.5 to 2 um (i.e., up to 0.3% of the 0.635 mm thick disk substrate and up to 1% of the 0.25 mm thick disk substrate). When present in clusters, these inclusions will act like a flaw of about 50 um.

In the second route, the impurities produce pores. During the hot isostatic pressing ("hip") portion of the sinter-hip process (which typically involves a 200 MPa argon environment), the reducing environment reduces a significant portion of the metals in the oxide impurity pockets. This reduction dissociates the metal oxide compounds, and the metal ions diffuse into the zirconia lattice while the oxygen ions react with fugitive carbon to form CO which escapes the zirconia body. The end result of these migrations is that a pore on the order of 1 um is formed in the dense zirconia body which can not be closed by hipping overpressure. When present in clusters, such pores act as flaws on the order of 50 um.

Whether the impurities produce pores or second oxide phase pockets, it has now been recognized that extreme care must be taken to restrict the level of impurity in the raw powder and to densify the green body without using additional sintering aids. In some embodiments, the present invention uses a YTZP starting powder which has no more than 0.25 w/o, preferably no more than 0.1 w/o, and more preferably no more than 0.05 w/o, metal oxide impurity in order to prevent substantial formation of second oxide phase and/or pore clusters. One such powder is HSY-4.0, a highly pure YTZP powder manufactured by Daiichi Kigensho K. K. of Osaka, Japan, having about 0.01 w/o impurity. Providing a starting YTZP powder having less than 0.25 w/o impurity will help prevent the formation of second oxide phase pockets having a mean diameter of more than 0.3 um and pores having a mean diameter of more than 0.1 um.

It is believed the criticality of controlling impurities to less than 0.25 w/o in a YTZP disk substrate has not been previously recognized. For example, EP'895 merely required the starting powder to be at least 99.5% pure. Moreover, conventional knowledge regarding the impact of metallic oxides on YTZP strength was that slight additions of metallic oxides tended to improve YTZP strength. See, for example, U.S. Pat. Nos. 4,772,576; 4,886,768; and 4,900,701, which imply metal oxides act as sintering aids in YTZP. Masaki et al., *Int'l. J. High Technology Ceramics*, 2 (1986) pp. 85–98, recognized the helpful and harmful roles played by metal oxides in YTZPs and commented that the issue is an important subject to be studied in the future.

The second processing requirement that has been newly recognized as necessary is complete (i.e., more than 99.5%) binder burnout. Although not disclosed in the above cited YTZP disk substrate patent publications, typical YTZP production includes use of a binder to assist in green body formation which must then be burned from the green body prior to sintering. This burnout step is typically undertaken in air at about 500C. for about 2 hours. However, it is believed this conventional burnout procedure removes only about 99% of the binder from the green body, thus leaving the remaining 1% of the binder in the green body as char. This char becomes trapped in the densified ceramic along with residual oxygen when subsequent sintering forms a skin on the surface of the ceramic, the char and oxygen combine to produce products of combustion, and the space formerly occupied by the char becomes a pore which is not removed by hipping. When these conventionally produced pores (which are typically on the order of 1–3 um) are present in clusters, they act as a flaw of about 50 um. In order to completely eliminate the binder, the preferred embodiment of the present invention provides a binder burnout step wherein the green body is subjected to a soak of at least 500C. to about 800C. for at least 4 hours. It is believed the longer time and higher temperatures associated with this step provide a binder burnout of at least about 99.5%, resulting in a YTZP disk substrate having no more than 0.1 v/o porosity characterized by a mean pore diameter of no more than 0.1 um.

It has been found that requiring both the use of a high purity powder and a complete binder burnout step eliminates the second phase and porosity flaws to such an extent that it is possible to produce YTZP disk substrates having thicknesses of no more than 1.0 mm and biaxial flexural strengths of at least about 800 MPa. When the YTZP is stabilized by about 3 mol % yttria, the biaxial flexural strength is at least about 1400 MPa. When the YTZP is stabilized by between 3.9 mol % and 4.1 mol % yttria (i.e., about 4 mol % yttria), the biaxial flexural strength can be at least about 1100 MPa.

Preferably, the present invention includes less than 0.3 w/o Al, measured as alumina. Without wishing to be tied to a theory, it is believed allowing more than 0.3 w/o alumina causes an undesirable frequency of large, hard inclusions. It is also preferable that the present invention include less than about 0.25 w/o total Mg and Ca, as MgO and CaO. It is believed that allowing more than a total of 0.25 w/o of these compounds causes an undesirable frequency of soft inclusions.

More preferably, the present invention includes less than 0.1 w/o halides, measured as HX. It is believed that allowing more than 0.1 w/o halides causes undesirable residual porosity.

Preferably, the disk substrate also has less than 0.25 total w/o of lithium (Li), boron (B), scandium (Sc), Ga, Ge, Se, Sr, Nb, Mo, In, Sn, Ba, Ta, W, Pb, and Bi, measured as metallic oxides in their most oxidized states.

It has also been unexpectedly found that these disk substrates are suprisingly translucent. In particular, YTZP disk substrates having a thickness of about 0.635 mm (25 mil) and produced in accordance with the present invention were found to transmit 75.2% of 5 um wavelength light therethrough. Therefore, in accordance with the present invention, there is also provided a disk substrate consisting essentially of zirconia partially stabilized by a rare earth oxide, the disk substrate having a thickness of between about 254 mm and about 0.635 mm, and a 5 um wavelength light transmittance of at least 10%, preferably at least 25%, more preferably at least 50%, and most preferably at least 75% across its thickness. Without wishing to be tied to a theory, it is believed that the ability of the YTZP to transmit light is directly related to the absence of flaws therein. Since it is known that transmittance is inversely proportional to thickness, thinner disks are expected to have even more light transmittance. Accordingly, a 0.254 mm thick disk substrate having the transmittance as the 0.635 mm disk substrate described above should transmit at least about 85% of 5 um light.

Flatness is also a key parameter in ceramic disk substrate performance. Typical disk drive manufacturer specifications for disk substrates require the disk substrate to have a flatness of no more than 5 to 10 um, wherein flatness is measured as the maximum bow height across the entire disk substrate. However, it was discovered that simply sinter-hipping a cold pressed YTZP green body followed by surface finishing to a thickness of no more than 0.635 mm produced warped substrates. In particular, disk substrates having a diameter of 65 mm were found to have a flatness exceeding 50 um after sinter-hipping (at which time their thickness was about 1 mm), exceeding 20 um after grinding (at which time their thickness was about 0.8 mm), and often exceeding about 15 um after lapping and polishing (at which time their thickness was about 0.635 mm). This adverse finding was totally unexpected in light of the EP '895, which reports a flatness (surface undulation) of less than 0.05 um/4 mm, which would be similar to a flatness of only 0.75 um for 65 mm. It is believed that, at the low thicknesses of the present invention, inhomogeneous powder compaction over the cross section of the disk substrate leads to warpage of a degree not experienced by the thicker disk substrates of EP '895. Furthermore, initial attempts to cure the warpage problem by conventional thermal flattening were not successful in bringing the disk substrates into the desirable flatness range of less than 10 um. Only when the disk substrates were carefully lapped to an even thickness (i.e., a thickness variation in the disk substrate of less than 1 um) did the thermal flattening successfully produce flatnesses of less than 10 um. The careful lapping included ascertaining the thickness of each disk prior to lapping and then evenly distributing the thicker disk substrates over the lapping plate, thereby insuring parallel lapping.

In one preferred method of making the YTZP zirconia disk substrate of the present invention, a highly pure zirconia powder containing rare earth oxide is cold uniaxially pressed at between 100 MPa and 200 MPa to form a green blank having an 83 mm outer diameter and a 1.2 mm thickness; the blank is then subjected to a complete binder burnout step, sintered at between about 1300° C. and 1500° C. for about 1–4 hours to achieve a density of at least 95%; and then hipped in an inert gas such as argon at between 1300° C. and 1500° C. for between 0.5 and 4 hours to achieve a density of at least 99.9%. Next the fully dense, partially-stabilized YTZP zirconia blank is lapped with 22 $\mu$m alumina (on cast iron) and then with 5 $\mu$m alumina to a surface roughness Ra of about 100–1000 angstroms Å and a thickness variation of less than 1 um. The lapped disk substrate is thermally flattened to a flatness of less than 10 um, and then polished with an aqueous solution of about 1–50 w/o colloidal silica for about 15–120 minutes to achieve a surface roughness Ra of between about 3 and 8 angstroms, typically between about 5 and 8 angstroms.

In order to control impurity levels, the zirconia powder should have a metal oxide impurity content of less than 0.25 w/o, preferably less than 0.1 w/o, more preferably less than 0.05 w/o. It has been found that the powders manufactured by Daiichi Kigensho KK of Osaka, Japan provide this desired level of purity. More preferably, the zirconia powder is partially stabilized by a rare earth oxide at a concentration of between about 2.5 mol % and about 5 mol % and has a grain size of less than 1 um. Most preferably, the rare earth oxide is yttria and is present as 4 mol % of the zirconia powder.

In some embodiments, the powder is spray dried to produce 50 to 150 um granules and an external lubricant (such as butyl stearate) is added to the powder to eliminate problems with cracking during cold pressing.

Green body formation is preferably accomplished by cold uniaxially pressing the spray dried granules at 150–250 MPa into thin green bodies having a thickness of about 1.2 mm. The cold pressed body may optionally have an inner diameter hole. Although cold isostatic pressing is also contemplated by the present invention, it was found that cold isostatic pressing YTZP powder into 76.2 mm long, 63.5 mm diameter rods, densifying the rods, slicing the rods to thicknesses of about 0.5 mm, and then lapping to the desired thicknesses resulted in poor yields.

As noted above, complete binder burnout is needed to eliminate porosity. This is preferably accomplished by subjecting the thin green piece to a slow (1–2 C./min) ramp from room temperature to about 600C., soaking at 600 C. for at least about 4 hours, followed by a slow ramp to the desired sintering temperature. This cycle should eliminate at least about 99.5% of the binder.

It is believed that sinter-hipping the green body is also needed to attain the desired low porosity and to destroy the vast majority of agglomerates. In one preferred embodiment, the green piece is sintered at between 1300 C. and 1500 C. for about 1 to 5 hours in air to produce a density of at least about 95% and then hipped in 200 MPa argon at about 1300 C. to 1450 C. for about 0.5 to 4 hours to produce a density of at least about 99.9%, a porosity of less than 0.1 v/o and a mean pore size of less than 0.1 um.

The densified YTZP zirconia material of the present invention typically has a toughness of at least about 5 MPa $m^{1/2}$, preferably at least 6 MPa $m^{1/2}$ (as measured by the Chantikul indentation strength method as disclosed in the *Journal of the American Ceramics Society*, 64(9), 1981, pp. 539–44), a grain size of less than 1 micron, a four point flexural strength of at least 1000 MPa, and a density of at least 99.9% of theoretical density. It typically has less than 0.1 v/o porosity and the pores are typically no more than 0.1 um in mean diameter. There is typically less than 0.25 v/o second oxide phase of the densified ceramic which is present as inclusions, and these inclusions are typically less than 0.1 um in mean diameter. The densified ceramic typically contains at least about 70% tetragonal zirconia, less than 0.5% monoclinic zirconia, with the balance being cubic zirconia. The Vickers hardness at 1 kg load is at least 1300 kgf/mm2.

Next, the YTZP zirconia disk substrate blank is typically lapped to a finish of about 100–1000 angstroms. Factors believed to be influential in determining the surface characteristics of the lapped substrate include pressure, lapping speed, lapping media, pH and additives. Typical pressures range from about 1 psi to about 20 psi. Typical pH values range from about 7 to about 12. Typical additives include stabilizing agents. Typical lapping speeds range from 50 rpm to about 150 rpm. Typical lapping media include alumina, silicon carbide and boron carbide. In some embodiments, the partially stabilized YTZP zirconia disk substrate is lapped with successively finer alumina media to produce a surface roughness Ra of about 100–1000 angstroms. In one embodiment, the disk substrate is lapped with 22 μm alumina under 3 psi for about 30 minutes (to produce a 1–2 μm/min removal rate and a surface roughness Ra of between about 1200 and 1600 angstroms), lapped with 5 μm alumina for about 30 minutes (to produce a similar removal rate, a surface roughness Ra of between about 800 and about 900 angstroms and a thickness variation of less than 2 μm on 65 mm diameter disk substrates, and then lapped with 3 μm and 1 μm alumina (resulting in surface roughness Ra values of about 450 and 110 angstroms, respectively). In more preferred embodiments, lapping is performed simultaneously on both sides of the disk substrate by a Model AC 500 grinding machine, available from Peter Wolters of Plainville, Mass., at a pH of 7–12, and a speed of 50 to 150 rpm.

After the substrate is lapped, it typically has a flatness of about at least about 15 um and so must be thermally flattened. In one preferred embodiment, about 7 or 8 lapped disks having even thicknesses (i.e., less than 1 um variation from the average thickness) are stacked between two plates each having a thickness variation of less than 1 um, and are subjected to a slow temperature increase up to 1100 C., a soak at 1100 C. for 30 minutes, and a slow ramp down to room temperature. This procedure typically yields a flatness of about 2–10 microns, and typically about 4 to 6 um. Therefore, in further accordance with the present invention, there is provided a method of flattening, comprising the steps of:

a) providing a plurality of disk substrates consisting essentially of zirconia partially stabilized by a rare earth oxide having a thickness of between about 0.254 mm and 1.0 mm, an average flatness of at least about 15 um, and a thickness variation of less than 1 um, b) inserting the substrates between a pair of plates to form a column of substrates, each plate having a thickness variation of less than 1 um, c) heating the substrates in an environment having a temperature of at least 1000 C. for at least 15 minutes to reduce the flatness of each disk substrate to less than 10 um, preferably 5 um.

The level of polishing may affect the biaxial strength of the disc substrate. A number of factors are considered important to the polishing step, including wheel load; polishing speed; polishing medium type, size and concentration; and pad type. In the polishing step, the lapped disk substrates are typically placed on fibrous pads which are bonded to polishing plates within the polishing machine to retain the polishing media. Preferred pads include the SUBA 500 pad, available from Rodel of Newark, Del. Next, an aqueous solution containing between about 2 w/o and about 50 w/o, and preferably between about 10 w/o and about 25 w/o, colloidal silica is dripped onto the plates of the polishing machine. In one embodiment, NALCO 2350 colloidal silica, available from NALCO of Naperville, Ill., is used and its pH is adjusted to between about 7 and 12, preferably about 10.1. In another embodiment, Syton 500S, available from Optical Manufacturer's International of Downers Grove, Ill., is used. Once the disk substrates have been placed on the pads and the colloidal silica has been added, the polishing begins. Polishing is generally undertaken at a load of between about 1.5 psi and about 18.5 psi, preferably between about 1 and 10 psi, for between about 15 and about 120 minutes. In general, it has been found that longer polishing times combined with lower loads produced the finest finishes.

The finished disk substrates typically have a thickness of between 0.254 mm and 0.635 mm, more typically between 0.254 0.381 mm, most typically in the sizes of 0.254 mm, 0.381 mm and 0.635 mm. Their diameters are typically between 34 mm and 65 mm, more typically between 34 mm and 48 mm, most typically in the sizes of 34 mm, 48 mm, and 65 mm. Their surface finish can be less than 10 angstroms Ra, preferably between 4 and 8 angstroms Ra. Their flatness is generally less than 10 um, and typically between about 4 and 6 um. The variation in their thickness ("even thickness") is preferably less than 1 um. The disk substrates having a thickness of about 0.635 mm typically possess a translucence characterized by an ability to transmit 5 um wavelength light with a transmittance value of at least 10%, preferably at least 25%, more preferably at least 50%, and most preferably at least 75%.

Since the disk substrates of the present invention have a high elastic modulus, it is believed they can withstand high disk revolution speeds (i.e., 10,000 rpm) and high shock (i.e., 1000 G) despite their thinness.

For the purposes of the present invention, a "surface roughness Ra" is considered to be the mean height deviation from the normal surface of the zirconia disk substrate. Unless otherwise stated, the surface roughness Ra is measured by means of an optical profilometer, in particular a white light interference microscope such as those available from Zygo Corp. of Middlefield, Conn. Biaxial flexure strength is measured with two ring fixtures, the first having an outer diameter of 10 mm, and the second having an inner diameter of 5 mm.

EXAMPLE I

A highly pure zirconia powder containing 4 mol % yttria was cold uniaxially pressed at between 100 MPa and 200 MPa to form a green blank having a 65 mm outer diameter and a 1.2 mm thickness.

A complete binder burnout step was undertaken by subjecting the thin green piece to a slow (1–2 C./min) ramp from room temperature to about 600 C., soaking at 600 C. for at least about 4 hours, followed by a slow ramp to the desired sintering temperature. The sintering soak was performed at between about 1300° C. and 1500° C. for about 1–4 hours to achieve a density of at least 95%. The sintered body was then hipped in an inert gas such as argon at between 1300° C. and 1500° C. for between 0.5 and 4 hours to achieve a density of at least 99.9%.

Next, the fully dense, partially-stabilized YTZP zirconia blank is lapped with 22 μm alumina (on cast iron) and then with 5 μm alumina to a surface roughness Ra of about 100–1000 angstroms Å and a variation of less than 1 um. The lapped disk substrate is then thermally flattened to a flatness of about 2 to 10 um, and then polished with an aqueous solution of about 1–50 w/o colloidal silica for about 30–120 minutes to achieve a surface roughness Ra of between about 4 and 8 angstroms, typically between about 4 and 6 angstroms.

The discs, which had a thickness of about 0.635 mm, were tested in biaxial flexure and a mean strength of about 1383 MPa was found.

EXAMPLE II

YTZP disks were made in substantial accordance with Example I, except that the disk substrates were only machined (not lapped or polished), to a final thickness of 0.889 mm. The mean biaxial flexure strength was found to be about 1145 MPa.

EXAMPLE III

YTZP disks were made in substantial accordance with Example I, except that the starting powder was HSY-3.0 from Daiichi (a zirconia powder containing 3 mol % yttria, and the disk substrates were only machined (not lapped or polished), to a final thickness of 0.863 mm. The mean biaxial flexure strength was found to be about 1486 MPa.

EXAMPLE IV

YTZP disks were made in substantial accordance with Example I, except that the starting powder was YZ-100 (a zirconia powder containing 2.7 mol % yttria), and the disk substrates were only machined (not lapped or polished), to a final thickness of 0.787 mm. The mean biaxial flexure strength was found to be about 1210 MPa.

COMPARATIVE EXAMPLE I

A dense rod having a 2.511 diameter and a 3" length was processed substantially similarly to the blank of Example I, except the green body was formed by cold isostatically pressing at 200 MPa. The dense rod was then sliced with a diamond saw into slices of about 1.2 mm. However, about 80% were broke by the slicing operation.

COMPARATIVE EXAMPLE II

A dense rod having a 2.5" diameter and a 3" length was processed substantially similarly to the rod of Comparative Example I, except that the slices were made to a 2 mm thickness. These thicker disk substrates were then ground to 0.5 mm and lapped to about 0.25 mm. The yield was about 50%.

COMPARATIVE EXAMPLE III

Ten ground disk blanks were formed as in the method disclosed in Example I up to the method of flattening. These disks had a 65 mm outer diameter (OD), a flatness of about 2 to 20 um (median of about 11 um), and a relatively uneven thickness variation of at least 2 um. All ten disks were stacked between two thick plates of hot pressed silicon carbide (in particular, NC-203, available from Saint-Gobain/ Norton Industrial Ceramics Corp. of Worcester, Mass.) having a flatness of about 2 um. The stack was then subjected to heat treatment which included a peak 1100 C. soak for 30 minutes. The average flatness was found to improve about 7 um from about 12 um to about 8 um, as measured by a Zygo laser interferometer, but about 45% of the disk substrates still had flatnesses of at least 10 um.

COMPARATIVE EXAMPLE IV

Fifteen ground disk blanks were processed substantially similarly to Comparative Example III above, except that fifteen blanks were included in the stack. The resulting average flatness was found to have worsened by about 3 um. It is believed the excessive number of blanks contributed to the worse flatness.

EXAMPLE V 7 or 8 lapped disks were processed substantially similarly to Comparative Example III above, except that the lapping procedure was controlled by evenly distributing the thicker disk substrates throughout the lapping area to provide a thickness variation in each disk substrate of less than about 1 um. The average flatness was found to improve about 15 um from about 20 um to about 5 um, as measured by a Zygo laser interferometer, with most of the disk substrates having a flatness of 4 to 6 um, and none exceeding 10 um.

I claim:

1. A disk substrate consisting essentially of zirconia partially stabilized by a rare earth oxide, the disk substrate having a thickness of no more than 1.0 mm, a diameter of at least 10 mm, an impurity content of less than 0.25 weight percent, and a mean pore size of no more than 0.1 um.

2. The disk substrate of claim 1 further comprising inclusions having a mean diameter of no more than 0.3 um.

3. The disk substrate of claim 1 having a surface roughness Ra of between about 4 and 8 angstroms.

4. The disk substrate of claim 1 having a porosity of no more than 0.1 volume percent.

5. The disk substrate of claim 1 having a biaxial flexure strength of at least 800 MPa.

6. The disk substrate of claim 1 having a thickness of between 0.254 mm and 0.635 mm and a translucence characterized by at least 10% transmittance of 5 um wavelength light across its thickness.

7. The disk substrate of claim 1 having a Vickers hardness of at least 1300 kgf/mm2.

8. The disk substrate of claim 1 having a biaxial flexure strength of at least 1100 MPa, wherein the zirconia is partially stabilized by yttria comprising between 3.9 mol % and 4.1 mol % of the disk substrate.

9. A method of making a zirconia body consisting essentially of zirconia partially stabilized by a rare earth oxide, comprising the steps of:

a) mixing a raw powder consisting essentially of zirconia and a rare earth oxide with a binder, the raw powder having an impurity content of no more than about 0.25 weight percent, to form a mixture, b) forming a green body from the mixture, c) subjecting the green body to a temperature of between about 500 C. and 800 C. for at least four hours to achieve at least 99.5% binder burnout, d) sintering the green body to produce a sintered body having a density of at least 95% of theoretical density, and e) hot isostatic pressing the sintered body to provide a dense body having a porosity of less than 0.1 volume percent with a mean pore size of no more than 0.1 um.

10. The method of claim 9 wherein the impurity content of the raw powder has no more than 0.1 weight percent impurity.

11. The method of claim 9 wherein the impurity content of the raw powder has no more than 0.05weight percent impurity.

12. The method of claim 9, wherein the hot isostatic pressing of step e) is performed in a reducing environment.

* * * * *